(12) United States Patent
Boo

(10) Patent No.: US 11,821,446 B2
(45) Date of Patent: Nov. 21, 2023

(54) WEDGE-SHAPED TONGUE GROOVE

(71) Applicant: Välinge Innovation AB, Viken (SE)

(72) Inventor: Christian Boo, Kågeröd (SE)

(73) Assignee: VÄLINGE INNOVATION AB, Viken (SE)

( * ) Notice: Subject to any disclaimer, the term of this patent is extended or adjusted under 35 U.S.C. 154(b) by 11 days.

(21) Appl. No.: 17/556,146

(22) Filed: Dec. 20, 2021

(65) Prior Publication Data
US 2022/0213912 A1  Jul. 7, 2022

(30) Foreign Application Priority Data

Jan. 7, 2021  (SE) .................................. 2150005-3

(51) Int. Cl.
| | | |
|---|---|---|
| *F16B 12/24* | (2006.01) | |
| *F16B 12/20* | (2006.01) | |
| *A47B 47/04* | (2006.01) | |

(52) U.S. Cl.
CPC ............ *F16B 12/24* (2013.01); *A47B 47/042* (2013.01); *F16B 12/20* (2013.01); *A47B 2230/06* (2013.01); *A47B 2230/16* (2013.01)

(58) Field of Classification Search
CPC ............ A47B 47/0066; A47B 47/0075; A47B 47/025; A47B 47/042; A47B 2088/902; A47B 2230/0029; A47B 2230/0037; A47B 2230/0081; A47B 2230/06; A47B 2230/16; F16B 5/0012; F16B 5/0016; F16B 5/0044; F16B 5/0052; F16B 5/002; F16B 12/125; F16B 12/20; F16B 12/24; F16B 12/26;

(Continued)

(56) References Cited

U.S. PATENT DOCUMENTS 7,634,884 B2 * 12/2009 Pervan .................. F16B 5/0016
52/391
8,887,468 B2  11/2014 Håkansson et al.
(Continued)

FOREIGN PATENT DOCUMENTS

WO  WO 2015/038059 A1  3/2015

OTHER PUBLICATIONS

Meijer, U.S. Appl. No. 17/847,655 entitled "Panels Comprising a Mechanical Locking Device and an Associated Assembled Article", filed in the U.S. Patent and Trademark Office Jun. 23, 2022.
(Continued)

*Primary Examiner* — Josh Skroupa
(74) *Attorney, Agent, or Firm* — Boone IP Law

(57) ABSTRACT

A set comprising a first panel, a second panel and a mechanical locking device for locking the first panel to the second panel is disclosed. The first panel includes a first edge surface and a first panel surface and the second panel includes a second edge surface and a second panel surface. The mechanical locking device includes an insertion groove at the first edge surface, wherein the insertion groove has a first displacement surface and an opposite second displacement surface, a bottom surface and a depth direction. The insertion groove includes a flexible tongue, and an edge tongue including a tongue groove, wherein the flexible tongue is configured to cooperate with the tongue groove for locking of the first panel to the second panel, and the first and the second displacement surface of the insertion groove are converging.

9 Claims, 7 Drawing Sheets

(58) Field of Classification Search
CPC ............... F16B 12/46; F16B 2012/043; F16B 2012/046; F16B 2012/103; F16B 2012/466; Y10T 403/602; Y10T 403/7075; Y10T 403/7092
See application file for complete search history.

(56) References Cited

U.S. PATENT DOCUMENTS

| | | | |
|---|---|---|---|
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,640,989 B2 * | 5/2020 | Pervan | E04C 2/38 |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,968,936 B2 | 4/2021 | Boo et al. | |
| 11,060,302 B2 * | 7/2021 | Ylikangas | E04F 15/105 |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brännström et al. | |
| 11,246,415 B2 | 2/2022 | Derelöv et al. | |
| 11,272,783 B2 | 3/2022 | Derelöv | |
| 11,326,636 B2 | 5/2022 | Pervan | |
| 11,506,235 B2 * | 11/2022 | Fransson | F16B 12/26 |
| 2012/0279161 A1 | 11/2012 | Håkansson et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2016/0007751 A1 | 1/2016 | Derelöv | |
| 2016/0174704 A1 | 6/2016 | Boo et al. | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2019/0113061 A1 | 4/2019 | Håkansson et al. | |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |
| 2021/0079650 A1 | 3/2021 | Derelöv | |
| 2021/0148392 A1 | 5/2021 | Brännström et al. | |
| 2021/0180630 A1 | 6/2021 | Bruno et al. | |
| 2021/0190112 A1 | 6/2021 | Derelöv | |
| 2021/0207635 A1 | 7/2021 | Håkansson et al. | |
| 2021/0222716 A1 | 7/2021 | Derelöv et al. | |
| 2021/0262507 A1 | 8/2021 | Svensson et al. | |
| 2021/0262508 A1 | 8/2021 | Svensson et al. | |
| 2021/0276108 A1 | 9/2021 | Derelöv et al. | |
| 2021/0285480 A1 | 9/2021 | Derelöv et al. | |
| 2021/0381251 A1 | 12/2021 | Svensson | |
| 2022/0018373 A1 | 1/2022 | Boo | |
| 2022/0049735 A1 | 2/2022 | Meijer | |
| 2022/0186761 A1 | 6/2022 | Derelöv et al. | |

OTHER PUBLICATIONS

Håkansson et al., U.S. Appl. No. 17/869,911 entitled "Mechanical Locking System for Building Panels", filed in the U.S. Patent and Trademark Office Jul. 21, 2022.
U.S. Appl. No. 15/642,757, Peter Derelöv, filed Jul. 6, 2017.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/220,574, Peter Derelöv, filed Dec. 14, 2018.
U.S. Appl. No. 16/386,874, Peter Derelöv, filed Apr. 17, 2019.
U.S. Appl. No. 16/663,603, Magnus Fridlund, filed Oct. 25, 2019.
U.S. Appl. No. 16/722,096, Peter Derelöv and Christian Boo, filed Dec. 20, 2019.
U.S. Appl. No. 16/951,394, Niclas Håkansson and Darko Pervan, filed Nov. 18, 2020.
U.S. Appl. No. 16/953,908, Peter Derelöv, Hans Brännström and Agne Pålsson, filed Nov. 20, 2020.
U.S. Appl. No. 17/119,392, Jimmie Bruno and Simunic, filed Dec. 11, 2020.
U.S. Appl. No. 17/126,518, Peter Derelöv, filed Dec. 18, 2020.
U.S. Appl. No. 17/398,416, Thomas Meijer, filed Aug. 10, 2021.
U.S. Appl. No. 17/514,055, Marko Sostar, filed Oct. 29, 2021.
U.S. Appl. No. 17/524,293, Hans Brännström, Agne Pålsson and Peter Derelöv, filed Nov. 11, 2021.
U.S. Appl. No. 17/546,356, Peter Derelöv and Hans Brånnström, filed Dec. 9, 2021.
U.S. Appl. No. 17/665,160, Oscar Rydsjö, Marko Sostar and Patrick Carlsson, filed Feb. 4, 2022.
Sostar, Marko, U.S. Appl. No. 17/514,055 entitled "Set of Panels, A Method for Assembly of the Same, and a Locking Device for a Furniture Product," filed in the U.S. Patent and Trademark Office Oct. 29, 2021.
Brännström, Hans, et al., U.S. Appl. No. 17/524,293 entitled "Assembled Product and a Method of Assembling the Assembled Product," filed in the U.S. Patent and Trademark Office on Nov. 11, 2021.
Rydsjö, Oscar, U.S. Appl. No. 17/665,160 entitled "Mounting Bracket," filed in the U.S. Patent and Trademark Office Feb. 4, 2022.

* cited by examiner

WEDGE-SHAPED TONGUE GROOVE

CROSS REFERENCE TO RELATED APPLICATIONS

The present application claims the benefit of Swedish Application No. 2150005-3, filed on Jan. 7, 2021. The entire contents of Swedish Application No. 2150005-3 are hereby incorporated herein by reference in their entirety.

TECHNICAL FIELD

Embodiments of the present disclosure relate to panels configured to be locked together with a mechanical locking device. The panels may be panels that may be assembled and locked together to obtain a furniture product, such as a bookshelf, a cupboard, a wardrobe, a box, a drawer or a furniture component and may thereafter be dismantled. The mechanical locking device may comprise a flexible tongue.

TECHNICAL BACKGROUND

A furniture product provided with a mechanical locking device is known in the art, as evidenced by WO2015/038059. The furniture products earlier described comprise a first panel connected perpendicular to a second panel by a mechanical locking device comprising a flexible tongue in an insertion groove.

The above description of various known aspects is the applicant's characterization of such, and is not an admission that any of the above description is considered as prior art.

Embodiments of the present disclosure address a need to provide panels that can be assembled and dismantled, having an improved stiffness and strength of the mechanical locking device.

SUMMARY

It is an object of certain aspects of the present disclosure to provide an improvement over the above described techniques and known art. A specific objective is to improve assembling of panels, such as furniture panels, locked together by a mechanical locking device. The panels may be a part of a furniture product, such as a furniture component, a drawer, a cupboard, a bookshelf, a wardrobe, a kitchen fixture, or a box.

A further object of at least certain aspects of the present disclosure is to facilitate assembling of panels configured to be assembled with a locking device that is easy to use and install and which reduces the risk of damaging the panels during production thereof.

A further object of at least certain aspects of the present disclosure is to facilitate assembling of panels configured to be assembled without the need of using any tools.

A further object of at least certain aspects of the present disclosure is to facilitate assembling of panels configured to be assembled with a locking device that is easy to use and install and which reduces the risk of incorrect installation thereof.

A further object of at least certain aspects of the present disclosure is to facilitate assembling of panels configured to be assembled in a more stable and aesthetic way.

At least some of these and other objects and advantages that will be apparent from the description have been achieved by a set comprising a first panel, a second panel and a mechanical locking device for locking the first panel to the second panel, wherein the first panel comprises a first edge surface and a first panel surface and the second panel comprises a second edge surface and a second panel surface, the mechanical locking device comprises an insertion groove at the first edge surface, wherein the insertion groove has a first displacement surface and an opposite second displacement surface, a bottom surface and a depth direction, wherein the insertion groove comprises a flexible tongue, and an edge tongue comprising a tongue groove, wherein the flexible tongue is configured to cooperate with the tongue groove for locking of the first panel to the second panel, and characterized in that the first and the second displacement surface of the insertion groove are converging.

According to an aspect an angle between the first and the second displacement surface of the insertion groove is more than about 0° to about 5°, preferably more than about 0° to about 3°, more preferably about 1° to about 2°.

According to an aspect an angle between a main plane of the insertion groove and the first displacement surface of the insertion groove is about 0° to about 5°, preferably about 0° to about 3°, more preferably about 1° to about 2°. The main plane of the insertion groove is oriented along a longitudinal direction of the insertion groove.

According to an aspect the second displacement surface of the insertion groove is essentially parallel with the main plane of the insertion groove.

According to an aspect an angle between the first displacement surface of the insertion groove and a first side surface of the first panel is about 45° to about 90°, preferably about 45° to about 70°, more preferably about 60° to about 65°.

According to an aspect an angle between the second displacement surface and a second side surface of the first panel is about 90° to about 135°, preferably about 110° to about 125°, more preferably about 115° to about 120°.

According to an aspect the flexible tongue comprises a first locking surface and a second locking surface, the first locking surface is configured to cooperate with the tongue groove for locking of the first panel to the second panel in a first direction when the flexible tongue is positioned in the insertion groove in a first orientation, and the second locking surface of the flexible tongue is configured to cooperate with the tongue groove for a locking of the first panel to the second panel in a first direction when the flexible tongue is positioned in the insertion groove in a second orientation.

According to an aspect the first locking surface and the second locking surface is essentially symmetrically positioned on the flexible tongue.

According to an aspect the first direction for locking of the first panel to the second panel is perpendicular to the first panel surface.

According to an aspect the bottom surface is extending between the first displacement surface and the opposite second displacement surface.

According to an aspect the core of the first panel and/or of the second panel may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

According to an aspect the first panel and/or the second panel may also be of solid wood.

According to an aspect the first panel and/or the second panel may be provided with a decorative layer, such as a foil or a veneer, on one or more surfaces.

BRIEF DESCRIPTION OF THE DRAWINGS

These and other aspects, features and advantages of which embodiments of the disclosure are capable of, will be apparent and elucidated from the following description of embodiments and aspects of the present disclosure, reference being made to the accompanying drawings, in which.

DETAILED DESCRIPTION

Figure 1:
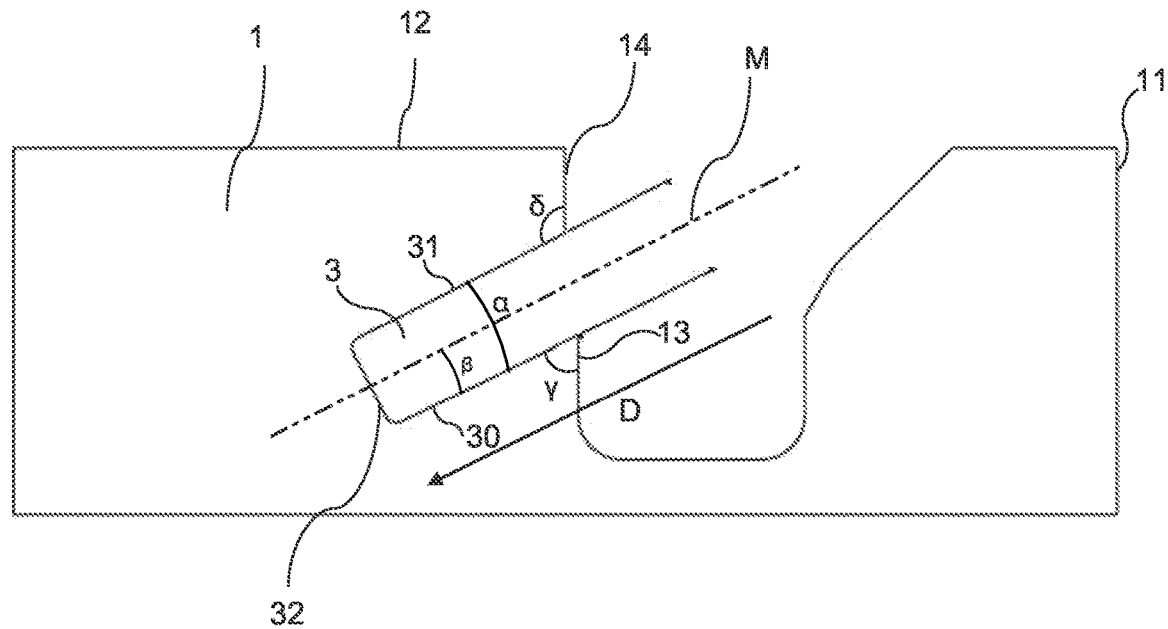
FIG. 1 shows a side view of an exemplary embodiment of the first panel.

Specific embodiments of the disclosure will now be described with reference to the accompanying drawings. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. The terminology used in the detailed description of the embodiments illustrated in the accompanying drawings is not intended to be limiting of the disclosure. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

When the word "about" is used in this specification in connection with a numerical value, it is intended that the associated numerical value include a tolerance of +/−10% around the stated numerical value.

The different aspects, alternatives and embodiments of the disclosure disclosed herein can be combined with one or more of the other aspects, alternatives and embodiments described herein. Two or more aspects can be combined.

Figure 3:
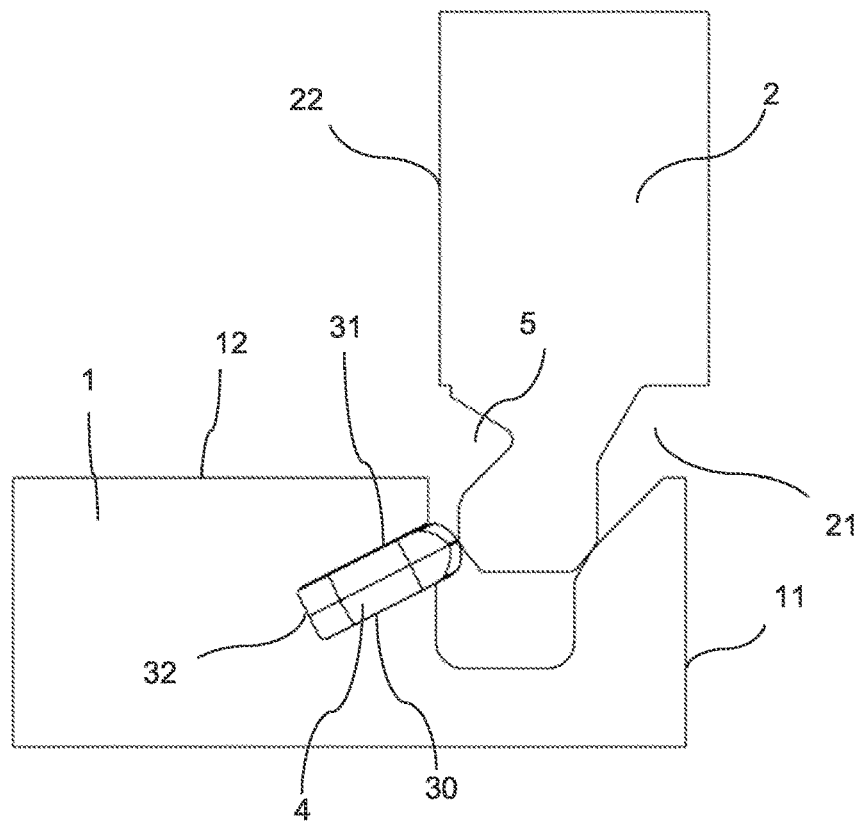
FIGS. 3-4 show a side view of an exemplary embodiment of the disclosure during assembling.
Figure 4:
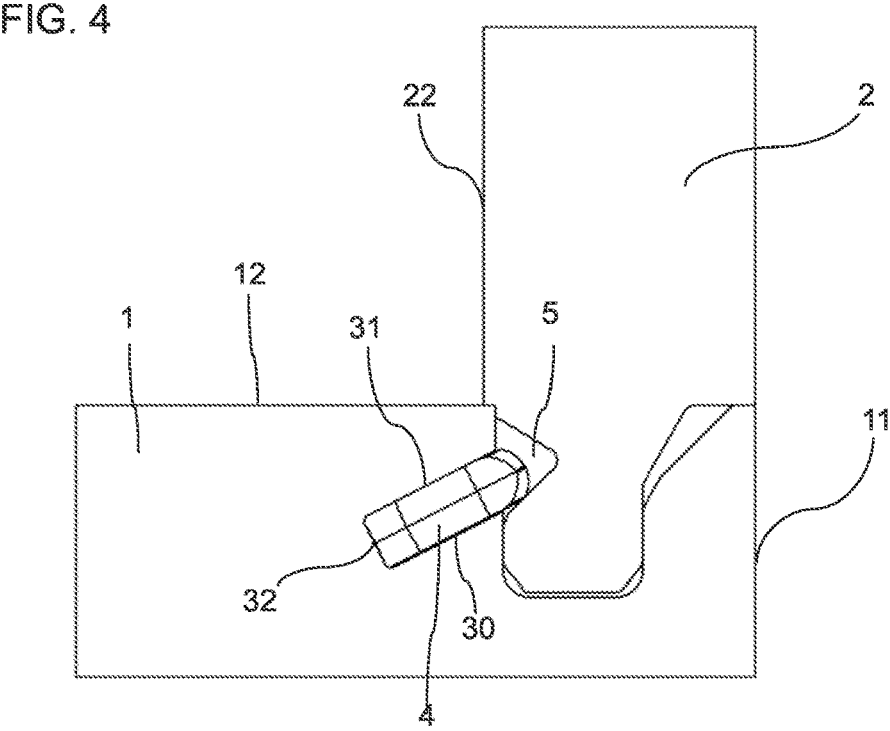

A first embodiment of the disclosure is shown e.g. in FIGS. 3-4 including a set comprising a first panel 1, a second panel 2 and a mechanical locking device for locking the first panel 1 to the second panel 2. The first panel 1 comprises a first edge surface 11 and a first panel surface 12 and the second panel 2 comprises a second edge surface 21 and a second panel surface 22. The mechanical locking device comprises an insertion groove 3 at the first edge surface 11, wherein the insertion groove 3 has a first displacement surface 30 and an opposite second displacement surface 31, a bottom surface 32 and a depth direction D. The insertion groove 3 comprises a flexible tongue 4. The mechanical locking device further comprises an edge tongue comprising a tongue groove 5, wherein the flexible tongue 4 is configured to cooperate with the tongue groove 5 for locking of the first panel 1 to the second panel 2. The first and the second displacement surface 30,31 of the insertion groove 3 are converging, e.g., so as to result in a wedge-shaped insertion groove. This can result in an improved assembling of the first panel 1 and the second panel 2 since the converging first and the second displacement surface 30,31 may prevent the flexible tongue 4 from being pinched in the insertion grove 3. Furthermore, this can result in an improved stiffness and strength of the mechanical locking device. For example, in illustrative embodiments, the flexible tongue 4 and the tongue groove 5 are configured such that the flexible tongue 4, when inserted in the tongue groove 5, contacts, under compressive pressure, both the first and second displacement surfaces 30, 31 along only a portion of the longitudinal extent of the insertion groove 3, and contacts only one of the first and second displacement surfaces 30, 31 at another portion of the longitudinal extent of the insertion groove 3 that is closer to the opening thereof (or contacts both surfaces 30, 31, but with less compressive pressure).

Figure 2:
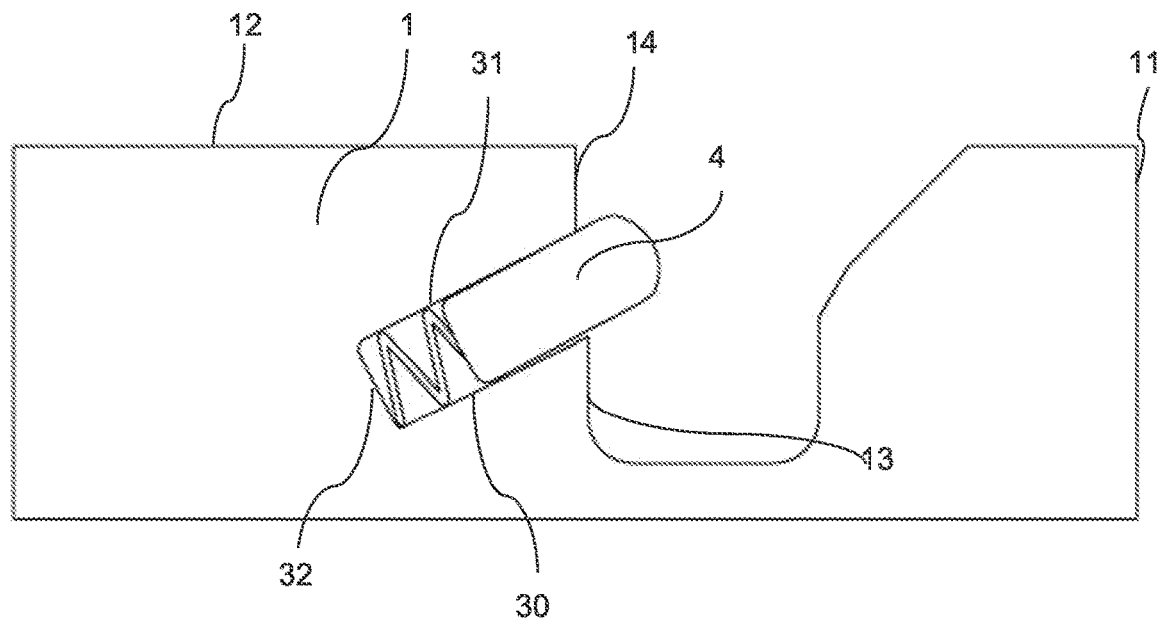
FIG. 2 shows a side view of an exemplary embodiment of the first panel, where a flexible tongue is positioned in the tongue groove.

The first panel is shown in detail in FIGS. 1-2.

The first panel 1 and the second panel 2 are preferably panels for a furniture product and may be a part of a frame of a furniture product.

For a furniture product, the set is preferably configured for locking the first panel 1 to the second panel 2 with the first panel surface 12 perpendicular or essentially perpendicular to the second panel surface 22.

An angle α between the first and the second displacement surface 30,31 of the insertion groove 3 may be more than about 0° to about 5°, preferably more than about 0° to about 3°, more preferably about 1° to about 2°.

An angle β between a main plane M of the insertion groove 3 and the first displacement surface 30 of the insertion groove 3 may be about 0° to about 5°, or about 0° to about 3°, or about 1° to about 2° or about 0.1° to about 1°, or about 0.5°.

The angle β between a main plane M of the insertion groove 3 and the first displacement surface 30 of the insertion groove 3 may be greater than about 0.1.

The second displacement surface 31 of the insertion groove 3 may be essentially parallel with the main plane M of the insertion groove 3. According to this embodiment, only the first displacement surface 30 diverges from the main plane M of the insertion groove 3.

An angle γ between the first displacement surface 30 of the insertion groove 3 and a first side surface 13 of the first panel 1 may be about 45° to about 90°, preferably about 45° to about 70°, more preferably about 60° to about 65°. The first side surface 13 is a surface of the first panel 1 that is immediately adjacent to, and located below, the insertion groove 3.

An angle δ between the second displacement surface 31 and a second side surface 14 of the first panel 1 may be about 90° to about 135°, preferably about 110° to about 125°, more preferably about 115° to about 120°. The second side surface 14 is a surface of the first panel 1 that is immediately adjacent to, and located above, the insertion groove 3.

The bottom surface 32 may extend between the first displacement surface 31 and the opposite second displacement surface 32.

FIGS. 3-4 show a view during assembling of a furniture product of an aspect of the disclosure. The second panel 2 may be assembled by displacing the second panel 2 relative the first panel 1 in a direction which is perpendicular to the first panel surface 12 which is shown in FIG. 3. The mechanical locking device may be configured to automatically lock the first panel 1 to the second panel 2 when the first panel 1 and the second panel 2 is in a locked position and the flexible tongue extends into the tongue groove 5 of the second panel which is shown in FIG. 4.

Figure 8A:
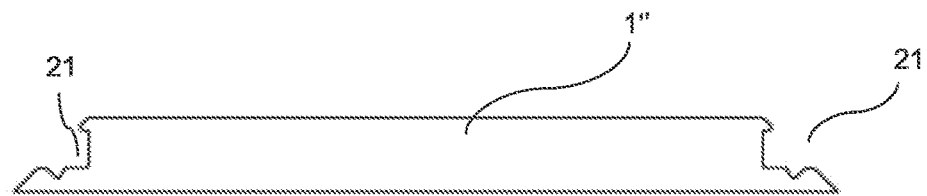
FIGS. 8A-8C show different exemplary embodiments of the first and second panel according to the disclosure.
Figure 8B:
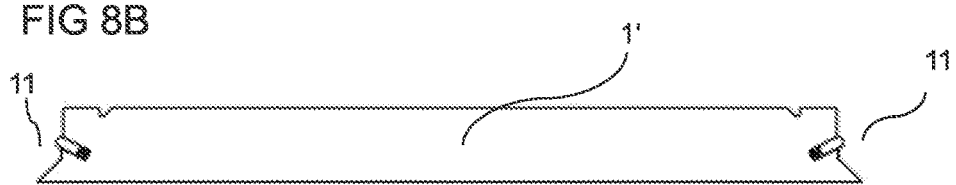
Figure 8C:
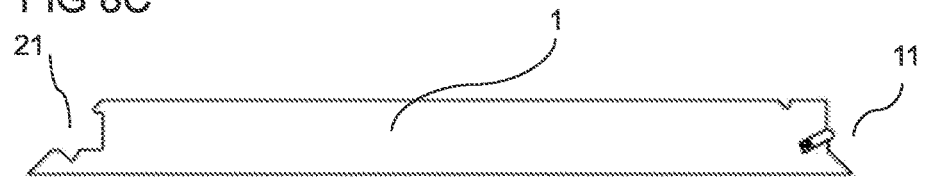

FIGS. 8A-8C shows different embodiments of the first and second panel 1, 2 of the present disclosure. The panel 1" of FIG. 8A comprises two second edge surfaces 21, the panel 1' of FIG. 8B comprises two first edge surfaces 11, while the panel 1 of FIG. 8C comprises one first edge surface 11 and one second edge surface 21.

Two panels 1" according to FIG. 8A can e.g. be used together with two panels 1' according to FIG. 8B for assembly of a box, while e.g. four panels 1 according to FIG. 8C can be used for assembly of a box. Alternatively, one panel 1" according to FIG. 8A, one panel 1' according to FIG. 8B, and two panels 1 according to FIG. 8D can be used for assembly of a furniture product, such as a box.

Figure 9:
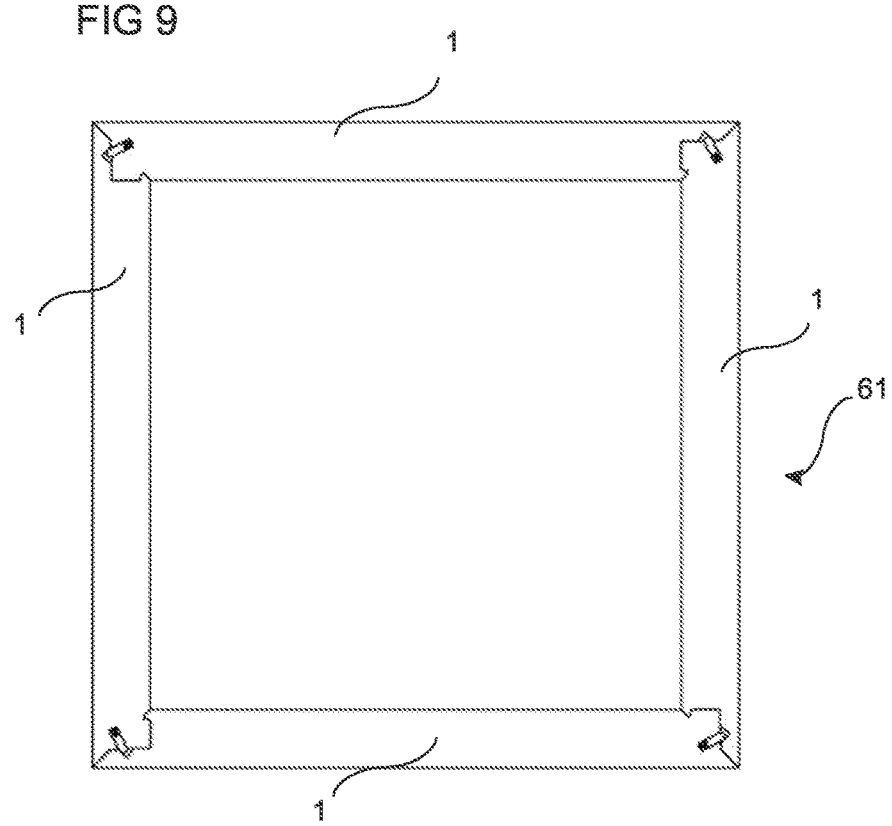
FIG. 9 shows an exemplary embodiment of a set of panels according to the disclosure in an assembled state.

FIG. 9 shows a set of four panels 1 as shown in FIG. 8C in a locked position, creating a box 61.

Figure 10:
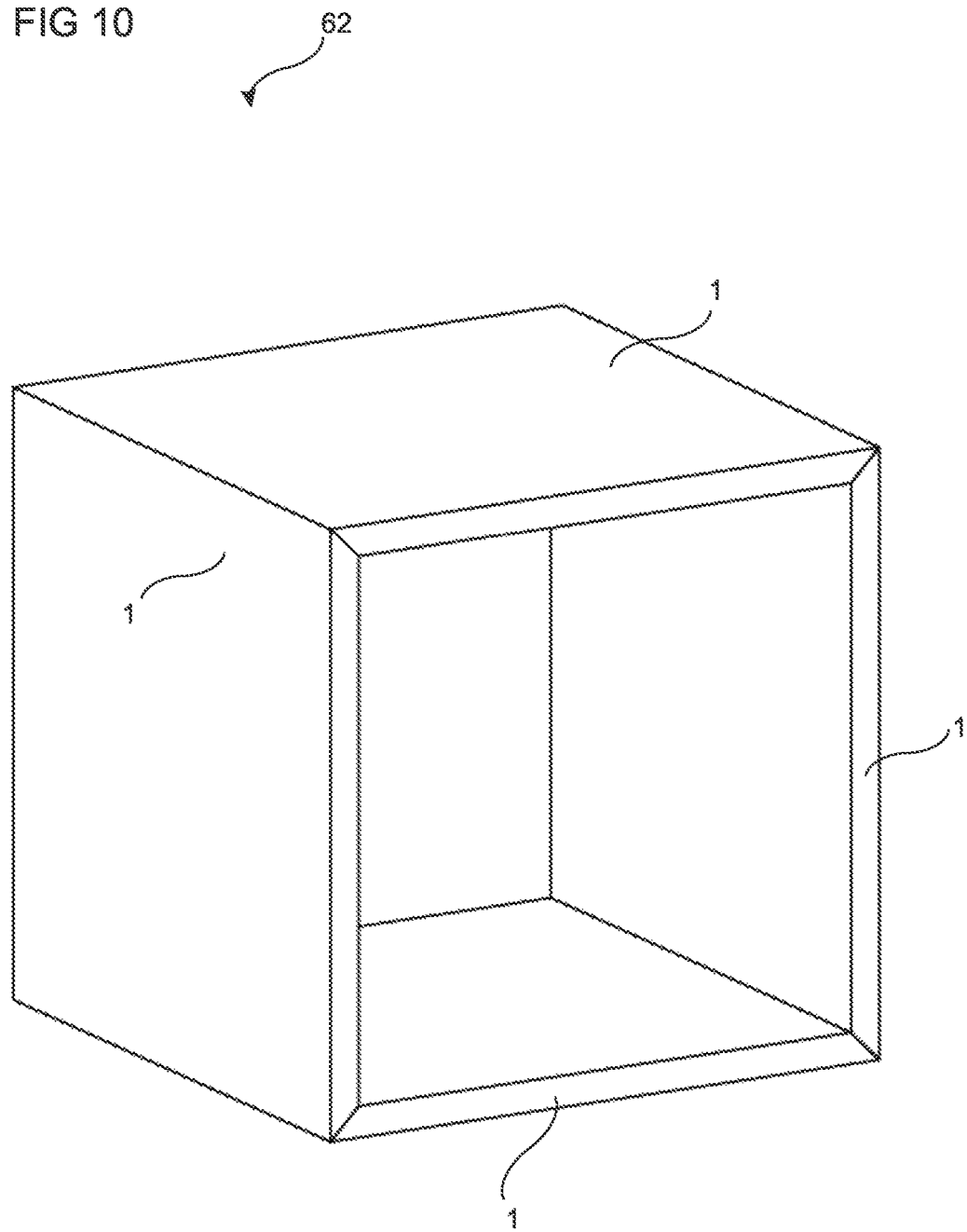
FIG. 10 shows a 3D-view of an exemplary embodiment of a set of panels according to the disclosure in an assembled state.

FIG. 10 shows a 3D view of four panels 1 according to the present disclosure in a locked position creating a furniture product 62. The mechanical locking device is not visible when the panels are assembled, giving a very aesthetic result.

For the different embodiments of the present disclosure described above, the first panel 1 and the second panel 2 are preferably panels for a furniture product and may be a part of a frame of a furniture product.

For a furniture product, the set is preferably configured for locking the first panel 1 to the second panel 2 with the first panel surface 12 perpendicular or essentially perpendicular to a second panel surface 22.

Figure 11A:
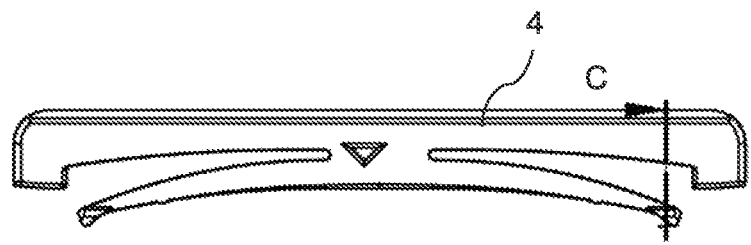
FIGS. 11A-11C and 12 show different views of a flexible tongue according to an exemplary embodiment of the disclosure.
Figure 11B:
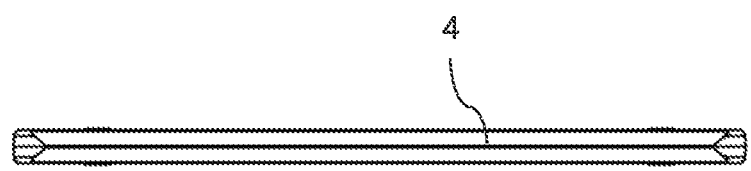
Figure 11C:
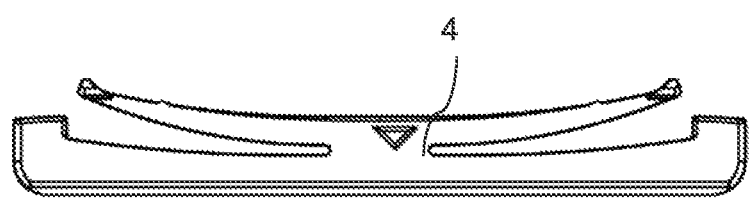
Figure 12:
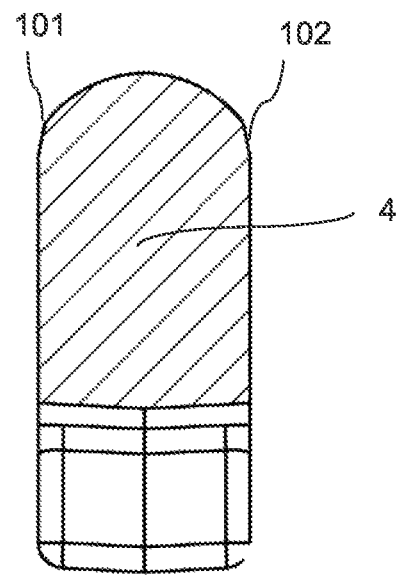

FIGS. 11A-11C and 12 show different views of a flexible tongue 4 according to an embodiment. FIG. 11A is a top-view, FIG. 11B a side view, FIG. 11C a bottom view and FIG. 12 show a crosscut of the flexible tongue 4 at a position C indicated in FIG. 11A. The flexible tongue 4 may comprise a first locking surface 101 and a second locking surface 102. The first locking surface 101 may be configured to cooperate with the tongue groove 5 for locking of the first panel 1 to the second panel 2 in a first direction when the flexible tongue 4 is positioned in the insertion groove 3 in a first orientation. The second locking surface 102 of the flexible tongue 4 may be configured to cooperate with the tongue groove 5 for a locking of the first panel 1 to the second panel 2 in a first direction when the flexible tongue 4 is positioned in the insertion groove 3 in a second orientation.

The first locking surface 101 and the second locking surface 102 may be essentially symmetrically positioned on the flexible tongue 4, as seen in FIG. 12.

The first direction for locking of the first panel 1 to the second panel 2 may be perpendicular to the first panel surface 12.

The flexible tongue 4 may comprise a flexible material to enable compression and a displacement of the flexible tongue 4 in the insertion groove 3 during assembling and disassembling.

The flexible tongue 4 may comprise an element which is flexible to enable compression and a displacement of the flexible tongue 4 in the insertion groove 3 during assembling and another element which is less flexible in order to improve the locking strength.

The flexible tongue 4 may be arranged at the bottom surface 32 of the insertion groove 3.

The flexible tongue 4 may be arranged between the tongue groove 5 and the bottom surface 32 of the insertion groove 3 in the locked position.

Figure 5:
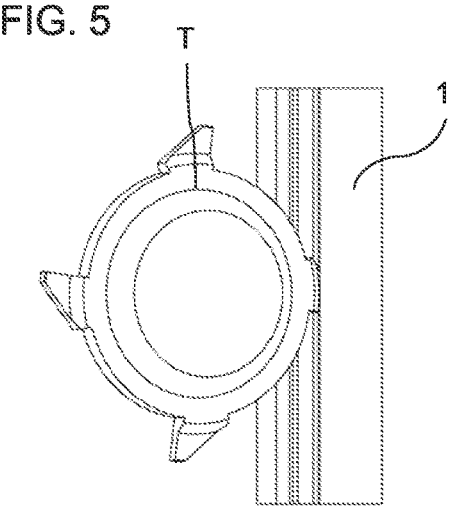
FIG. 5 shows a view of an exemplary embodiment of a tool used for producing the insertion groove.

The insertion groove 3 and the tongue groove 5 may be formed by mechanical cutting, such as milling or sawing. FIG. 5 shows a view of an embodiment of a tool T that may be used for producing the insertion groove 3 of the first panel 1.

Figure 6A:
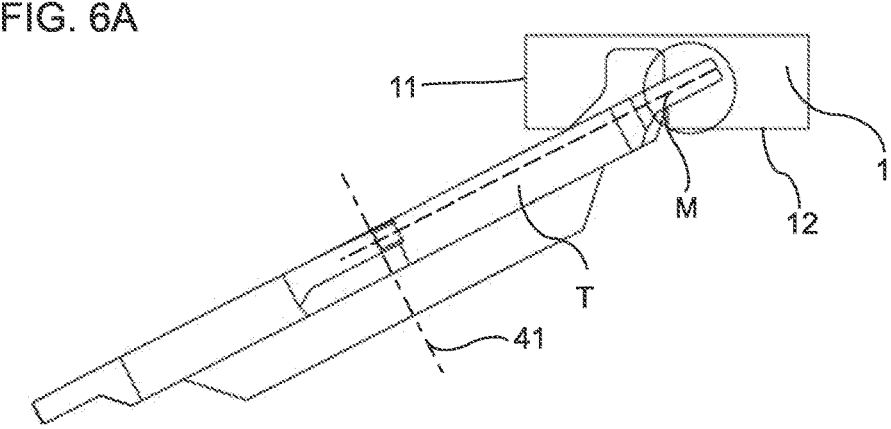
FIG. 6A shows a side view of an exemplary embodiment of the first panel when the tool is producing the insertion groove.
Figure 6B:
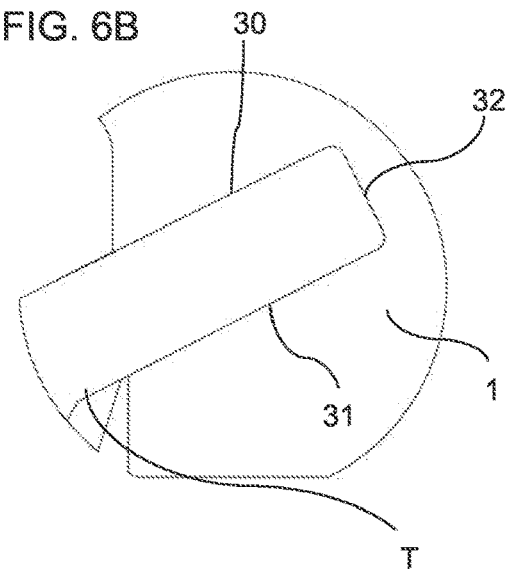
FIG. 6B shows an enlargement of the encircled area indicated in FIG. 6A. The tool is positioned in the end position, producing also the bottom surface of the insertion groove.

FIG. 6A shows a side view of an embodiment of the first panel 1 when the tool T is producing the insertion groove. FIG. 6B shows an enlargement of the encircled area indicated in FIG. 6A. The tool T is positioned in the end position, thus producing also the final bottom surface 32 of the insertion groove 3.

Figure 7A:
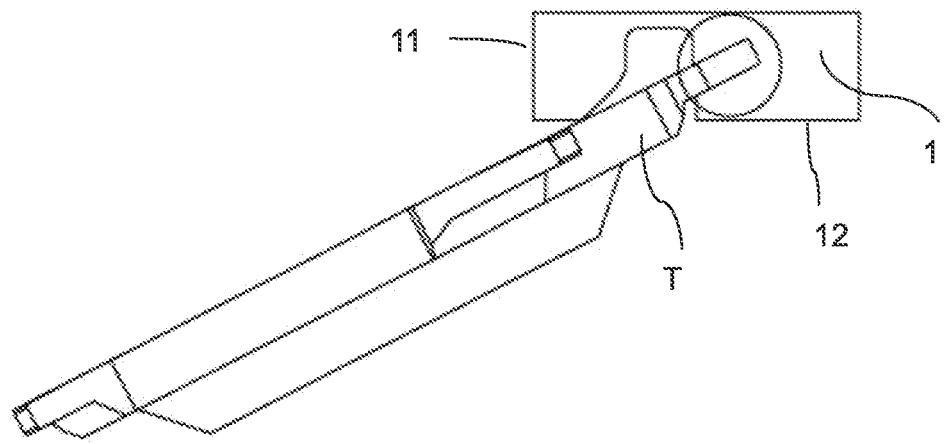
FIG. 7A shows a side view of an exemplary embodiment of the first panel when the tool has produced the insertion groove and the tool is being retracted, i.e. the tool does no longer extend all the way down to the bottom surface of the insertion groove.
Figure 7B:
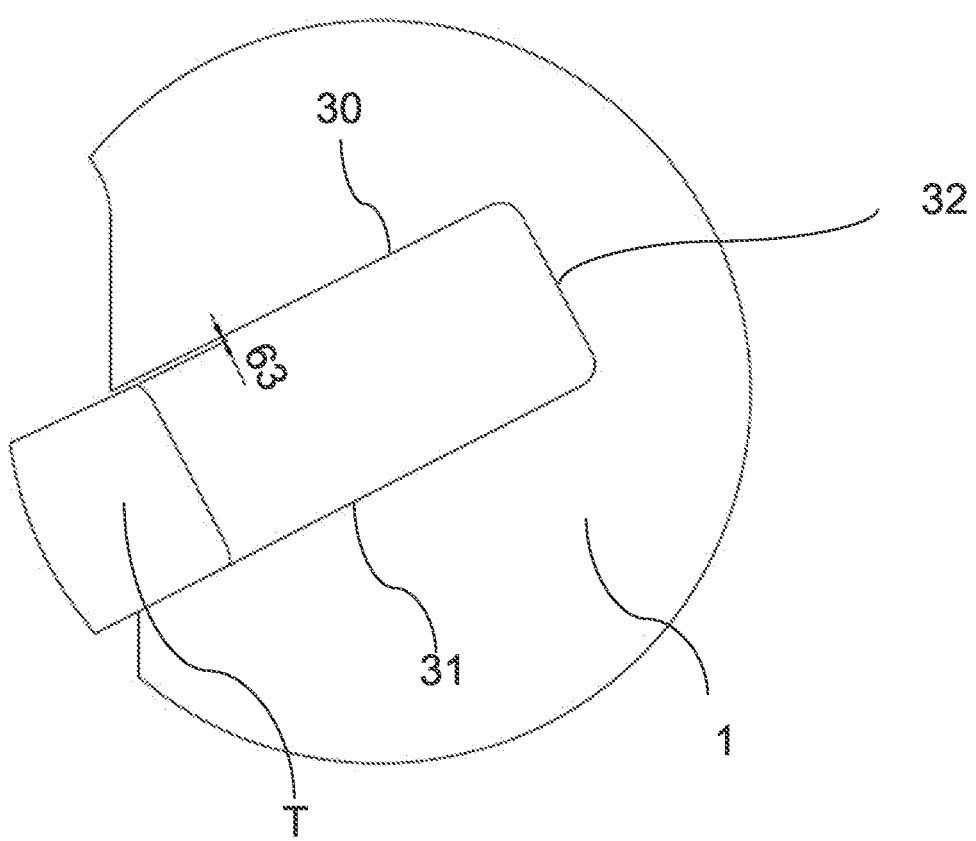
FIG. 7B shows an enlargement of the encircled area indicated in FIG. 7A, where it can be seen that the tool does not interact with both the first displacement surface and the opposite second displacement surface at the same time when the tool is being retracted.

FIG. 7A shows a side view of an embodiment of the first panel 1 when the tool T has produced the insertion groove 3 and is being retracted, i.e. the tool T no longer extends all the way down to the bottom surface 32 of the insertion groove 3. FIG. 7B shows an enlargement of the encircled area indicated in FIG. 7A, where the tool T no longer interacts with the first displacement surface 30 when the tool T is being retracted. There may be a distance 63 between the tool T and the first displacement surface 30 when the tool T is partly in the insertion groove 3 and is being retracted. This can minimize the risk of the first displacement surface 30 being damaged by the tool T when the tool T is retracted after the forming of the insertion groove 3.

The tool T may be configured to no longer interact with the second displacement surface 31 when the tool T is being retracted by virtue of a distance between the tool T and the second displacement surface.

The tool T may be configured to no longer interact with the first displacement surface 30 and second displacement surface 31 when the tool T is being retracted by virtue of the distance 63 between the tool T and the first displacement surface 31.

A damaged displacement surface may have the effect that the flexible tongue 4 is pinched in the insertion grove 3, e.g., during assembling of the first panel 1 and the second panel 2 or when the flexible tongue 4 is inserted into the insertion grove 3.

A damaged displacement surface may also have the result of loose fragment in the locking device which may have the effect that the locking strength is diminished or that the first panel 1 and the second panel 2 are prevented from being displaced to the locked position.

The tool T works in the same direction as the depth direction D. The rotational axis of the tool T may be perpendicular to the main plane M/depth direction D.

The core of the first panel 1 and/or of the second panel 2 may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel 1 and/or the second panel 2 may also be of solid wood.

The first panel 1 and/or the second panel 2 may be provided with a decorative layer, such as a foil or a veneer, on one or more surfaces.

The invention claimed is:

1. A set comprising:
a first panel,
a second panel, and
a mechanical locking device for locking the first panel to the second panel,
wherein the first panel comprises a first edge surface and a first panel surface and the second panel comprises a second edge surface and a second panel surface,
the mechanical locking device comprises:
an insertion groove at the first edge surface, wherein the insertion groove has a first displacement surface and an opposite second displacement surface, a bottom surface and a depth direction, wherein the bottom surface extends from the first displacement surface to the opposite second displacement surface,
wherein the insertion groove comprises a flexible tongue, and
an edge tongue comprising a tongue groove, wherein the flexible tongue is configured to cooperate with the tongue groove for locking of the first panel to the second panel, and
wherein the first displacement surface and the second displacement surface of the insertion groove are converging.

2. The set as claimed in claim 1, wherein an angle between the first and the second displacement surface of the insertion groove is within the range of greater than about 0° to about 5°.

3. The set as claimed in claim 1, wherein an angle between a main plane of the insertion groove and the first displacement surface of the insertion groove is within the range of about 0° to about 5°, wherein the main plane of the insertion groove is oriented along a longitudinal direction of the insertion groove.

4. The set as claimed in claim 1, wherein the second displacement surface of the insertion groove is essentially parallel with the main plane of the insertion groove, wherein the main plane of the insertion groove is oriented along a longitudinal direction of the insertion groove.

5. The set as claimed in claim 1, wherein an angle between the first displacement surface of the insertion groove and a first side surface of the first panel is about 45° to about 90°, wherein the first side surface is a surface of the first panel that is immediately adjacent to, and located below, the insertion groove.

6. The set as claimed in claim 1, wherein an angle between the second displacement surface and a second side surface of the first panel is about 90° to about 135°, wherein the second side surface is a surface of the first panel that is immediately adjacent to, and located above, the insertion groove.

7. The set as claimed in claim 1, wherein the flexible tongue comprises a first locking surface and a second locking surface, the first locking surface is configured to cooperate with the tongue groove for locking of the first panel to the second panel in a first direction when the flexible tongue is positioned in the insertion groove in a first orientation, and wherein the second locking surface of the flexible tongue is configured to cooperate with the tongue groove for a locking of the first panel to the second panel in a first direction when the flexible tongue is positioned in the insertion groove in a second orientation.

8. The set as claimed in claim 7, wherein the first locking surface and the second locking surface is essentially symmetrically positioned on the flexible tongue.

9. The set as claimed in claim 7, wherein the first direction for locking of the first panel to the second panel is perpendicular to the first panel surface.

* * * * *